(12) United States Patent
Chang

(10) Patent No.: US 7,343,076 B2
(45) Date of Patent: Mar. 11, 2008

(54) ALIGNMENT APPARATUS FOR USE IN TESTING OPTICAL MODULES

(75) Inventor: Keng-Ming Chang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,663

(22) Filed: Sep. 7, 2006

(65) Prior Publication Data

US 2007/0147764 A1    Jun. 28, 2007

(30) Foreign Application Priority Data

Dec. 23, 2005   (CN) .......................... 2005 1 0121254

(51) Int. Cl.
*G02B 6/00*     (2006.01)

(52) U.S. Cl. ..................................... 385/135

(58) Field of Classification Search ............... 385/135, 385/136, 137, 138, 147
See application file for complete search history.

(56) References Cited

U.S. PATENT DOCUMENTS

| | | | | | |
|---|---|---|---|---|---|
| 2,710,147 | A | * | 6/1955 | Birchfield | 238/232 |
| 3,209,647 | A | * | 10/1965 | Hall | 353/117 |
| RE26,619 | E | * | 7/1969 | Hall | 353/117 |
| 5,234,386 | A | * | 8/1993 | Nagai et al. | 474/148 |
| 5,445,045 | A | * | 8/1995 | Nagai et al. | 74/490.09 |
| 6,955,482 | B2 | * | 10/2005 | Rosenberg et al. | 385/92 |

* cited by examiner

*Primary Examiner*—Chandrika Prasad
(74) *Attorney, Agent, or Firm*—Jeffrey T. Knapp

(57) ABSTRACT

An exemplary optical module testing apparatus (100) includes a base (10) and a supporting element (20). The base has a testing hole (13) formed thereon. The supporting element has a plurality of supporting portions (23) formed thereon. The supporting element is slideably disposed on the base in such a manner that the supporting portions can be selectively aligned with the testing hole. The supporting portions are configured for supporting optical modules. The base has an upper surface (11), and a slide groove (12) is formed on the upper surface, and two slide slots (121) are formed on two sides of the slide groove.

7 Claims, 4 Drawing Sheets

ALIGNMENT APPARATUS FOR USE IN TESTING OPTICAL MODULES

DESCRIPTION

1. Field of the Invention

The present invention generally relates to optical module testing apparatuses and, more particularly, to an optical module testing apparatus.

2. Description of Related Art

Currently, digital camera modules are included as a special feature in a wide variety of portable electronic device and, of course, in stand-alone digital camera units. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

Referring to FIG. 4, an optical module testing method uses a modulation transfer function (MTF) testing apparatus 40 to test the image quality of an optical module. The MTF testing apparatus 40 includes a through hole 41 defined therein. The through hole 41 is configured for supporting an optical module 50. After the optical module 50 is tested, the optical module 50 should be removed manually and another optical module 50 should be positioned on the through hole 41 manually. Thus, the testing apparatus 40 has a low efficiency in testing optical modules.

Therefore, a new optical module testing apparatus is desired in order to overcome the above-described shortcomings.

SUMMARY OF THE INVENTION

In one embodiment thereof, an optical module testing apparatus includes a base and a supporting element. The base has a testing hole formed thereon. The supporting element has a plurality of supporting portions formed thereon. The supporting element is slideably disposed on the base in such a manner that the supporting portions can be selectively aligned with the testing hole. The supporting portions are configured for supporting optical modules.

Other advantages and novel features of the embodiments will become more apparent from the following detailed description thereof when taken in conjunction with the accompanying drawings.

BRIEF DESCRIPTION OF THE DRAWINGS

Many aspects of the present testing apparatus can be better understood with reference to the following drawings. The components in the drawings are not necessarily drawn to scale, the emphasis instead being placed upon clearly illustrating the principles of the testing apparatus and its potential applications. Moreover, in the drawings, like reference numerals designate corresponding parts throughout the several views.

DETAILED DESCRIPTION OF THE INVENTION

Figure 1:
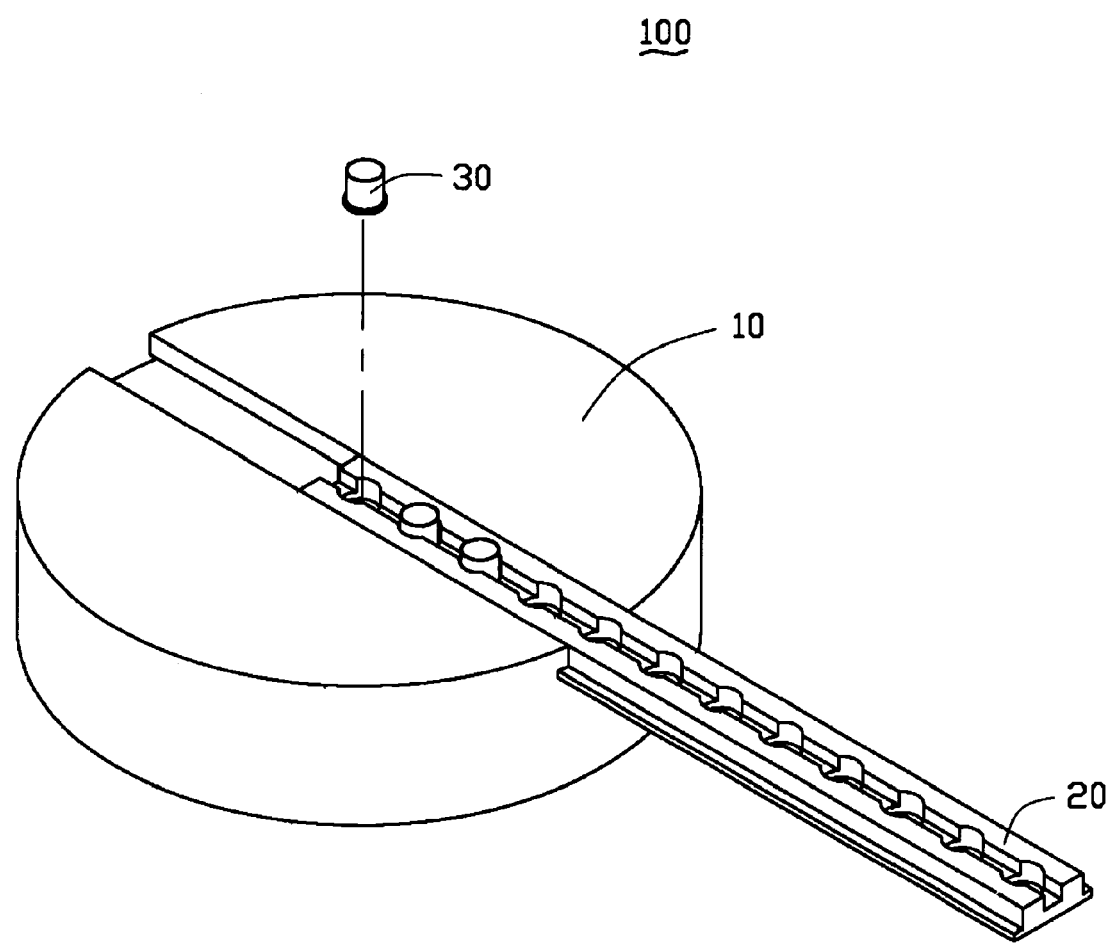
FIG. 1 is a schematic view of an optical module testing apparatus in accordance with a preferred embodiment.

Referring to FIG. 1, an optical module testing apparatus 100 according to a preferred embodiment includes a base 10, and a supporting element 20. The supporting element 20 is slideably disposed on the base 10. A predetermined amount of optical modules 30 are supported on the supporting element 20 to be tested.

Figure 2:
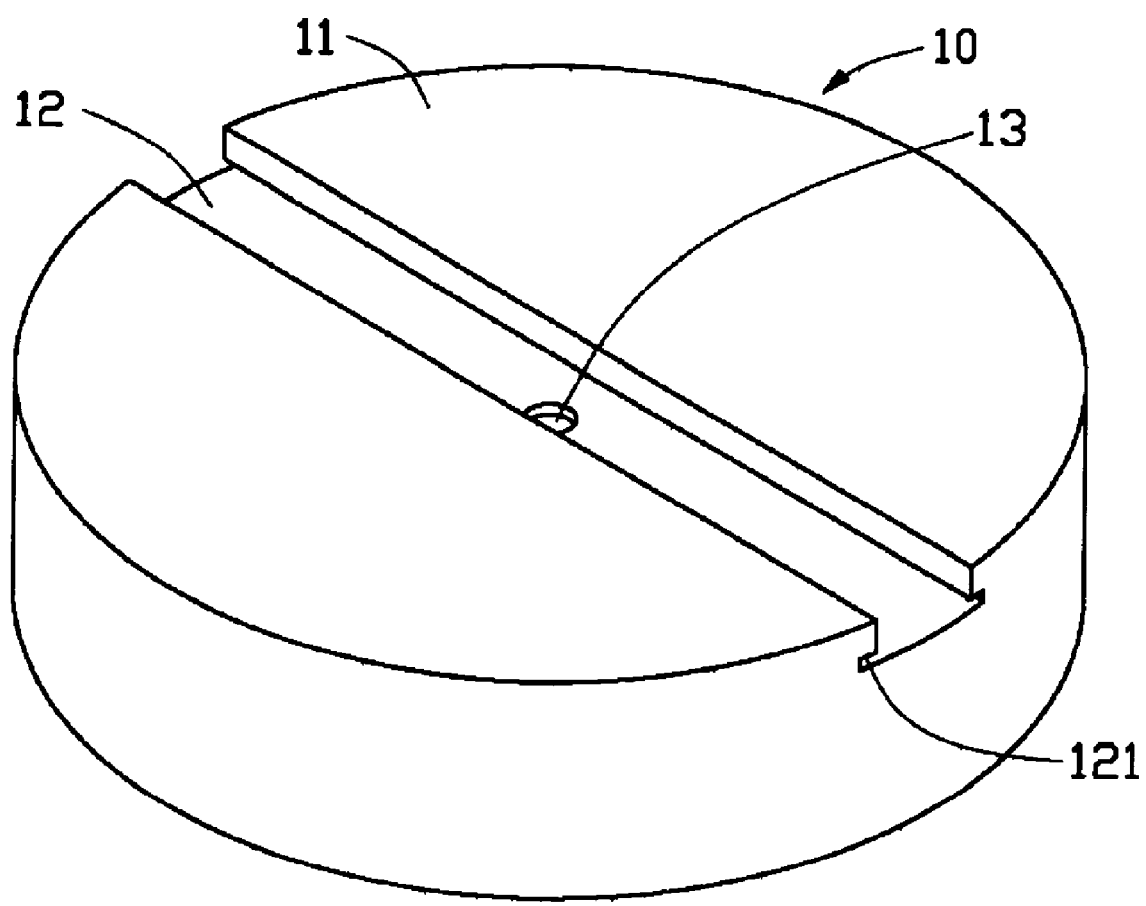
FIG. 2 is a schematic view of the base in FIG. 1.

Referring to FIG. 2, the base 10 is substantially cylindrical in shape. The base 10 has an upper surface 11, and a slide groove 12 is formed on the upper surface 11. The slide groove 12 runs through a center of the base 10 from one side to an opposite side. Two slide slots 121 are formed in two opposite lower sides of the slide groove 12. A testing hole 13 is formed in the slide groove 12 at the center of the base 10. The base 10 can also include a testing instrument (not shown) disposed below the testing hole 13 for testing an optical parameter of the optical module 30. The optical parameter can be a modulation transfer function.

Figure 3:
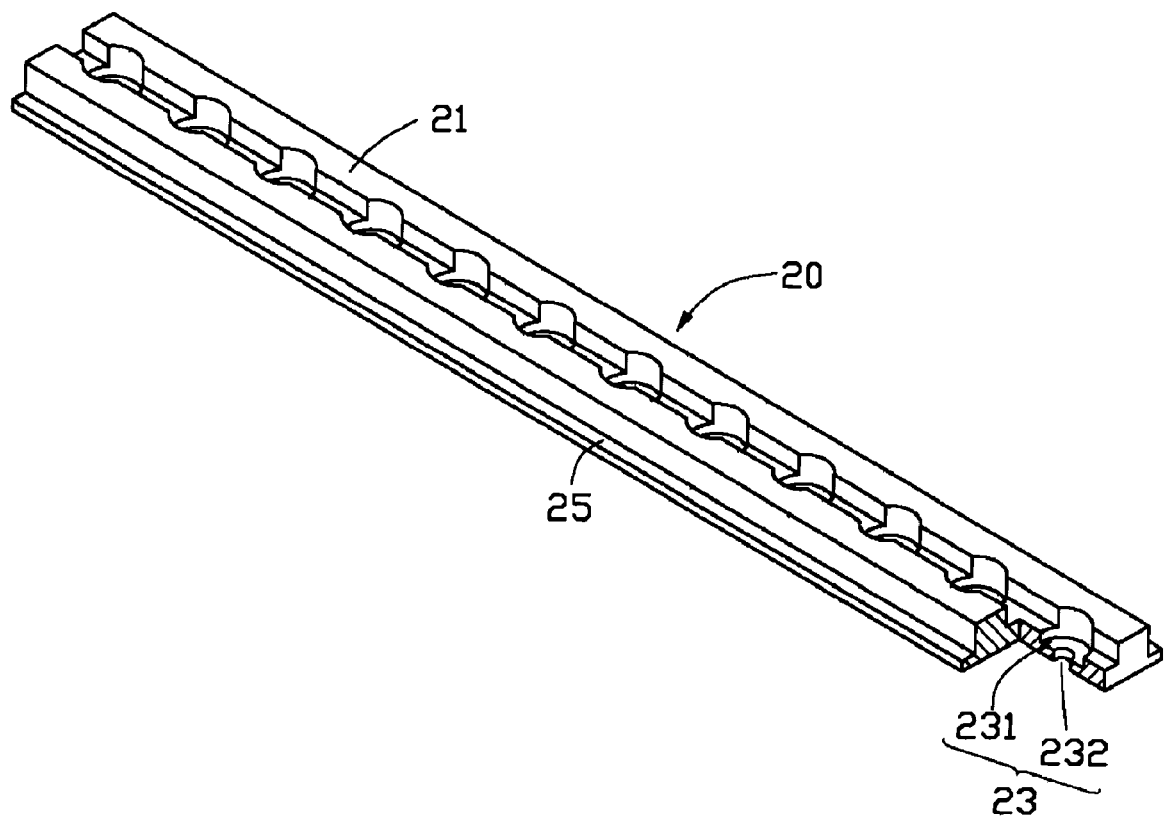
FIG. 3 is a schematic view of the supporting element in FIG. 1.
Figure 4:
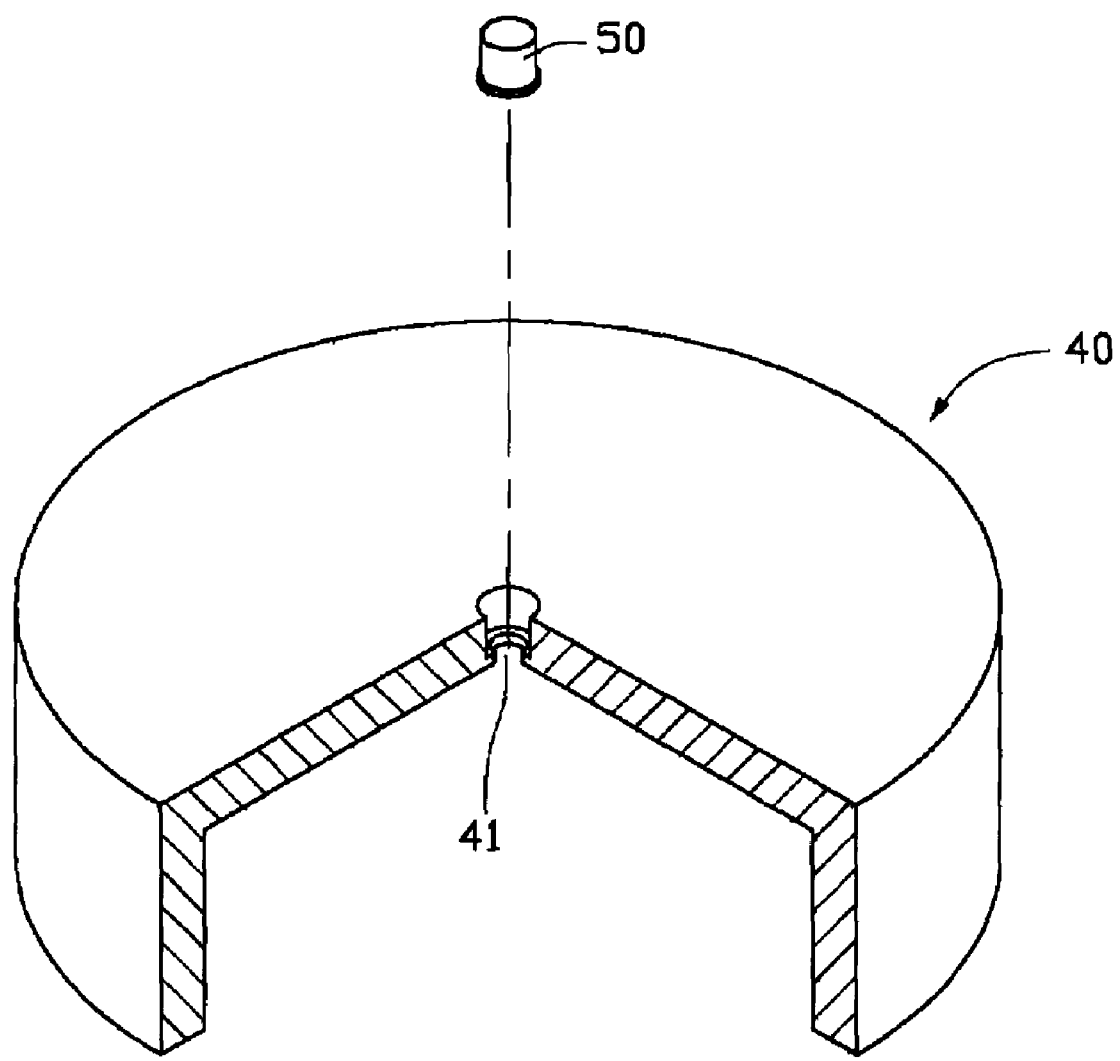
FIG. 4 is a schematic view of an MTF testing apparatus from the related art.

Referring to FIGS. 1-3, the supporting element 20 has a similar, mating shape to that of the slide groove 12 (i.e., matching cross-sections), and the supporting element 20 can be slideably disposed in the slide groove 12. The supporting element 20 includes a main body 21 and two opposite slide rails 25. The slide rails 25 are formed on two sides of the main body 21. The slide rails 25 have a same shape as that of the slide slot 121 of the base 10. The main body 21 has a predetermined amount of supporting portions 23 formed thereon. The supporting portions 23 are configured for supporting the optical modules 30. Each of the supporting portions 23 includes a supporting groove 231 and a through hole 232. The through hole 232 is formed on a lower surface of the supporting groove 231. The optical module 30 can be seated on/in the supporting groove 231 and exposed to the through hole 232.

Referring to FIGS. 1-3, in assembly of the optical module testing apparatus 100, the supporting element 20 is slideably disposed on the slide groove 12 of the base 10 with the slide rails 25 being engaged in the slide slots 121. In use, a plurality of optical modules 30 are disposed on the supporting grooves 231 of the supporting element 20. Then, the supporting element 20 slides to a predetermined location in a manner such that one of the supporting portions 23 is selectively aligned with the testing hole 13, so that the optical module 30 aims at the through hole 232 and the testing hole 13. Thus, the optical parameter of the optical module 30 is obtained, and another optical module 30 is moved to the predetermined location by the supporting element 20 and tested.

The optical module testing apparatus 100 can test a predetermined amount of optical modules 30 disposed on the supporting element 20 during a testing process. Thus, the optical module 100 can obtain an excellent testing efficiency.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An alignment apparatus for use in testing an optical module, comprising:

a base having a testing hole and a slide groove therein, the testing hole extending into the base from within the slide groove; and a supporting element having a plurality of supporting portions configured for supporting optical modules, the supporting element having a cross-sectional shape mating with that of the slide groove, the supporting element being slideably disposed within the slide groove in such a manner that the supporting portions are selectively alignable with the testing hole.

2. The alignment apparatus for use in testing an optical module as claimed in claim 1, wherein the base is cylindrical in shape.

3. The alignment apparatus for use in testing an optical module as claimed in claim 1, wherein the base has an upper surface, and the slide groove is formed in the upper surface.

4. The alignment apparatus for use in testing an optical module as claimed in claim 3, wherein two slide slots are formed on two sides of the slide groove.

5. The alignment apparatus for use in testing an optical module as claimed in claim 4, wherein the supporting element includes a main body and two slide rails formed on two sides of the main body, and the slide rails engage in the slide slots of the slide groove.

6. The alignment apparatus for use in testing an optical module as claimed in claim 5, wherein the supporting portions are formed on the main body.

7. The alignment apparatus for use in testing an optical module as claimed in claim 3, wherein each supporting portion includes a supporting groove and a through hole, the through hole are formed at a lower surface of the supporting groove, and the supporting groove and the through hole are configured for exposing the optical module in the upright direction.

* * * * *